Oct. 23, 1923.
L. CRANE
1,471,650
SUSPENSION JACK FOR GANG SAWS
Filed May 10, 1922
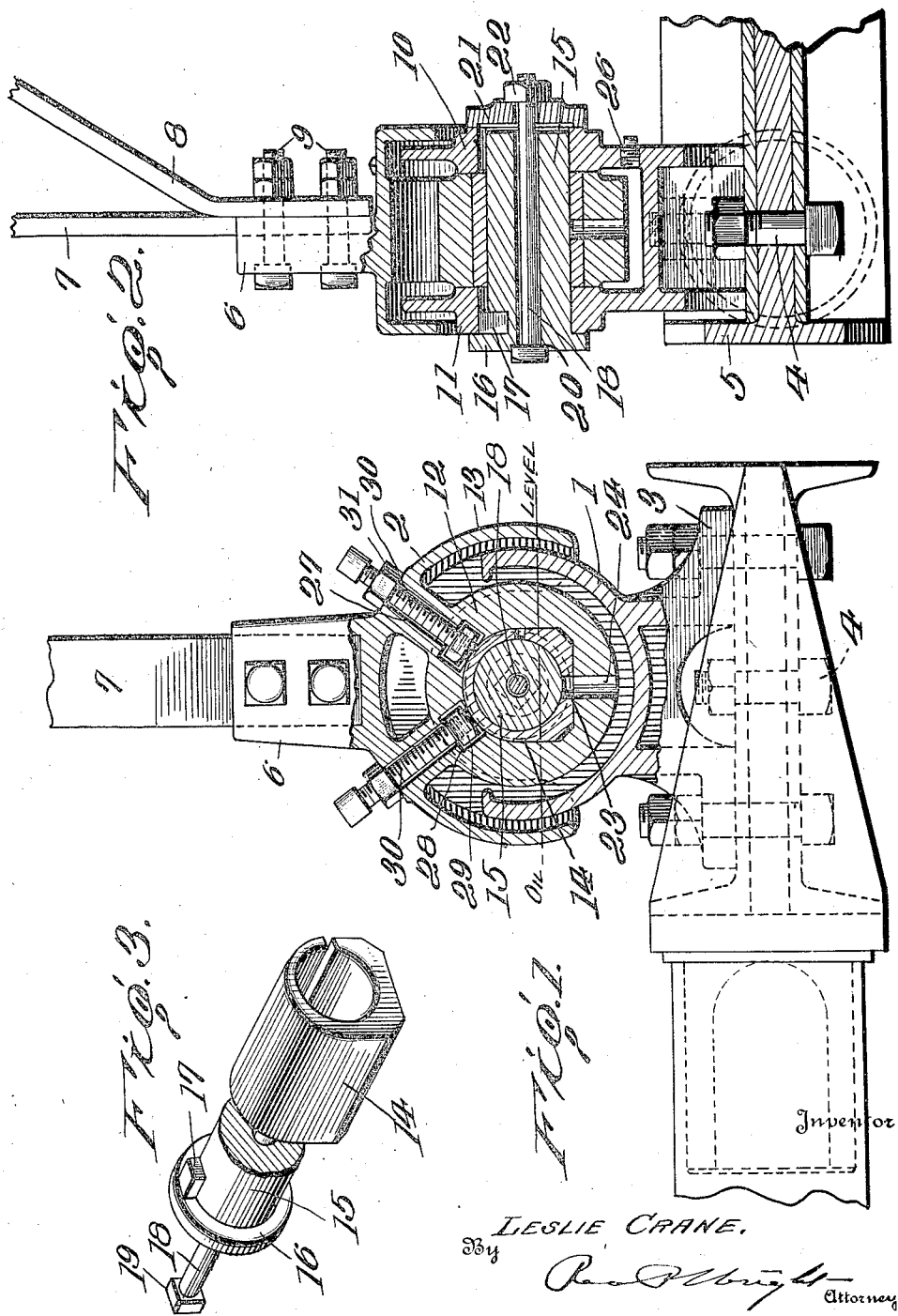
Leslie Crane,
By
Attorney Patented Oct. 23, 1923.

1,471,650

UNITED STATES PATENT OFFICE.

LESLIE CRANE, OF RUTLAND, VERMONT, ASSIGNOR OF ONE-HALF TO F. R. PATCH MANUFACTURING COMPANY, OF RUTLAND, VERMONT, A CORPORATION OF VERMONT.

SUSPENSION JACK FOR GANG SAWS.

Application filed May 10, 1922. Serial No. 559,923.

*To all whom it may concern:*

Be it known that I, LESLIE CRANE, a citizen of the United States, residing at Rutland, in the county of Rutland and State of Vermont, have invented certain new and useful Improvements in Suspension Jack for Gang Saws, of which the following is a specification, reference being had therein to the accompanying drawing.

This invention relates to certain new and useful improvements in suspension jack for gang saws, the object being to provide a jack for connecting the suspension bars of a stone sawing machine to the gang saw frame whereby the frame will be supported in a rigid manner and means provided for lubricating the jack in such a manner that the lubricating means is protected from the dirt and dust arising from the saws in operation.

Another and further object of the invention is to provide a suspension jack formed of two members so connected together and constructed that an oil receptacle is provided for thoroughly lubricating the bearing, means being provided in the form of a split bushing for taking up the wear to prevent lost motion.

Another and further object of the invention is to provide a suspension jack in which the parts are so connected and secured together that the lubricant is prevented from wasting and a construction is provided which enables the sections of the jacks to be readily assembled or taken apart.

Other and further objects and advantages of the invention will be hereinafter set forth and the novel features thereof defined by the appended claims.

In the drawings,

Figure 1 is a vertical section through my improved construction of jack, partly in elevation, showing the application of the same to a gang saw frame;

Figure 2 is a section taken at right angles to Figure 1; and

Figure 3 is a perspective view of the suspension pin and bushing.

In carrying out my invention I employ a jack composed of a lower section 1 and an upper section 2, the lower section being adapted to be connected to the corner of the gang saw frame and the upper section to the suspension bars carried by the sway bar of the sawing machine.

The lower section 1 is formed hollow and is provided with apertured foot portions 3 through which bolts 4 are adapted to pass for connecting the same to the gang saw frame 5, as clearly shown in Figures 1 and 2.

The upper section 2 is provided with a channeled extension 6 in which is secured a suspension bar 7 over which is arranged a diagonal brace 8, the suspension bar 7 and the brace 8 being secured to the extension by bolts 9 as clearly shown, the suspension bar and brace being connected to the sway bar on the sawing machine in the usual manner.

The hollow base member 1 forms an oil receptacle and the sides thereof are provided with apertured bosses 10, one of the bosses being provided with a groove 11 for the purpose hereinafter fully described.

The upper section 2 is provided with a central depending portion 12 and a hood portion 13 which extends down over the sides of the section 1 in order to form a cover for the oil receptacle formed therein. The central depending portion 12 of the upper section is provided with an opening having a curved upper portion and a three-sided lower portion in which is arranged a split bushing 14, the exterior of which corresponds in shape to the opening in the depending portion so as to prevent the bushing from rotating within the depending portion of the upper section and while I have shown an opening and bushing formed of a particular shape, it is, of course, understood that I do not wish to limit myself to the use of the particular shape shown as I am aware that slight changes can be made without departing from my invention, as the essential feature of forming the bushing and opening is to provide means for preventing the bushing from rotating and at the same time allow the bushing to contract and expand to fit the suspension pin, hereinafter described, which passes therethrough.

Extending transversely through the bushing 14 and the bosses 10 is a suspension pin 15 having at one end a head 16 and a lug 17, the lug 17 being adapted to extend within the notch 11 in order to prevent the pin from rotating. The head serves to form a closure for the end of the oil receptacle.

The suspension pin 15 is provided with a longitudinal bore through which extends bolt 18, the head 19 of which is seated in a recess 20 formed in the end of the suspension pin and the other end passes through a circular cap 21 which is secured in position over the opposite boss by a nut 22 working on the bolt 18 so as to securely fasten the suspension pin in position within the bushing in such a manner that the oil receptacle formed in the lower section is closed or sealed at this point to prevent leakage.

The oil within the chamber of the lower section is preferably maintained at a level as shown in dotted and dash lines in Figure 1 and the bushing 14 is provided with an opening 23 registering with an opening 24 formed in the depending portion 12 of the upper section so that the lubricant will be supplied freely to the suspension pin so as to maintain the same thoroughly lubricated. The lubricant is supplied to the receptacle through a plug closed opening 25 and the oil receptacle is provided with a drain plug closed opening 26 in order to allow the lubricant to be removed therefrom.

In order to provide means for taking up lost motion in the bushing, I provide the upper section with bores 27 which are enlarged as shown at 28 and in which I arrange nuts 29 through which adjusting bolts 30 are adapted to work, said bolts engaging the bushing 14 in such a manner that by tightening the nuts, the bushing will be compressed around the suspension pin in order to take up any lost motion and these bolts are provided with set nuts 31 for locking them in adjusted position.

From the foregoing description it will be seen that I have provided a suspension jack to be used in connection with a stone sawing machine composed of a lower section which is rigidly connected to the gang saw frame and an upper section which is pivotally connected to the lower section in such a manner that the bearing is maintained thoroughly lubricated and in such a manner that the lubricating means is protected from the dust arising from the saws when in operation.

It will also be seen that means in the form of a bushing is provided for the suspension pin so as to take up lost motion in case of wear.

While I have shown certain details of construction, I am aware that changes can be made without departing from the spirit of my invention.

What I claim is:—

1. A suspension jack for gang saws comprising a hollow lower section, an upper section provided with a projection extending into said lower section, said upper section having a hood portion extending over the lower section, a bushing carried by the upper section, a suspension pin fixed to said lower section extending through said bushing, said bushing and depending portion being provided with oil passages forming ducts through which lubricant contained within the hollow lower section is adapted to pass to the suspension pin.

2. A device of the kind described comprising a lower section having feet portions for connecting the same to a gang saw frame, said lower section being formed hollow to provide an oil receptacle, the walls of said lower section being provided with apertured bosses, an upper section having a hood portion extending over the lower section and a central depending portion extending into the lower section, a non-rotatable split bushing arranged within said depending portion, a suspension pin extending through said bosses and bushing, means for securing said pin to said lower section and bolts carried by the upper section arranged to engage said split bushing for adjusting said bushing on said pin.

3. A suspension jack for gang saw frames formed of two sections pivotally connected together, the lower section being provided with an oil receptacle and the upper section with a bushing, a headed pin, extending through the walls of the lower section and said bushing, said pin being keyed to the lower section and a bolt extending longitudinally through said suspension pin carrying a cap.

4. A suspension jack for gang saws comprising a hollow base section having feet portions for connecting the same to a gang saw frame and an upper section having an extension for connecting the same to the sway bar, said upper section being provided with a central depending portion having an irregular shaped opening, a bushing corresponding in shape to said opening arranged therein and a non-rotatable pin extending transversely through the walls of said lower section and said bushing and means for securing said pin within the lower section.

5. A suspension jack for gang saws composed of two sections, one section being formed hollow and the other having a projection extending into the hollow portion of said section, a hood portion carried by the upper section of said jack, a bushing carried by the upper section of said jack and a suspension pin extending through the lower section and bushing having means for securing it in position therein.

6. A suspension jack for gang saws comprising a base section adapted to be connected to the gang saw frame and a top section adapted to be connected to the suspension bars, said base section being provided with an oil chamber having apertured bosses in its side walls, one of the bosses being provided with a slot, the upper section being provided with a depending portion extending into the hollow portion of the base section and provided with an opening, a bushing arranged in said opening, a pin extending transversely through the bosses of the lower section and bushing of the upper section having a projection extending into the slot thereof and a hood portion formed on the upper section extending over said base section.

7. A suspension jack for gang saws comprising a fixed section and a swinging section pivotally connected together, said fixed section being provided with an oil chamber and a suspension pin for connecting said sections having means for securing said pin to said fixed section.

8. A suspension jack for swinging gang saws composed of two sections, one section being provided with an oil chamber to receive a projection of the other section, said projection being provided with an opening to receive a split bushing, a suspension pin extending through the walls of said base section and said bushing, means for securing said pin in position therein, nuts arranged within the upper section and bolts working in said nuts adapted to engage said split bushing for adjusting said bushing on said pin.

9. A suspension jack for gang saw frames formed of two sections pivotally connected together, one section being provided with an oil chamber and the other with a hood extending over said oil chamber, a headed suspension pin for connecting said sections together, a bolt extending longitudinally through said suspension pin and a cap carried by said bolt.

In testimony whereof I hereunto affix my signature.

LESLIE CRANE.